United States Patent

Gephardt et al.

[19]

[11] Patent Number: 6,163,848
[45] Date of Patent: Dec. 19, 2000

[54] SYSTEM AND METHOD FOR RE-STARTING A PERIPHERAL BUS CLOCK SIGNAL AND REQUESTING MASTERSHIP OF A PERIPHERAL BUS

[75] Inventors: Douglas D. Gephardt; Kelly M. Horton, both of Austin, Tex.

[73] Assignee: Advanced Micro Devices, Inc., Sunnyvale, Calif.

[21] Appl. No.: 08/125,406

[22] Filed: Sep. 22, 1993

[51] Int. Cl.[7] .................................................. G06F 13/00
[52] U.S. Cl. ............................................................. 713/322
[58] Field of Search ................................. 395/325, 750, 395/287

[56] References Cited

U.S. PATENT DOCUMENTS

| | | | |
|---|---|---|---|
| 4,835,737 | 5/1989 | Herrig et al. | 395/325 |
| 4,851,996 | 7/1989 | Boioli et al. | 395/550 |
| 5,056,060 | 10/1991 | Fitch et al. | 395/275 |
| 5,128,970 | 7/1992 | Murphy | 375/106 |
| 5,150,467 | 9/1992 | Hayes et al. | 395/325 |
| 5,167,024 | 11/1992 | Smith et al. | 395/375 |
| 5,195,185 | 3/1993 | Marenin | 395/325 |
| 5,369,748 | 11/1994 | McFarland et al. | 395/325 |
| 5,432,947 | 7/1995 | Doi | 395/750 |

FOREIGN PATENT DOCUMENTS

| | | |
|---|---|---|
| 62 150 453 | 12/1987 | European Pat. Off. . |
| 06 051 453 | 5/1994 | European Pat. Off. . |

*Primary Examiner*—Paul R. Myers
*Attorney, Agent, or Firm*—Conley, Rose & Tayon, PC; B. Noël Kivlin

[57] ABSTRACT

A system and method for re-starting a peripheral bus clock signal and requesting mastership of a peripheral bus are provided that accommodate a power conservation technique in which a peripheral bus clock signal may be stopped. If an alternate bus master requires mastership of the peripheral bus when the peripheral bus clock signal is stopped, the alternate bus master asserts a clock request signal for re-starting the peripheral bus clock. The clock request signal is broadcasted on the peripheral bus and is accordingly received by a clock control circuit. The clock control circuit responsively causes the re-starting of the peripheral bus clock signal. Subsequently, the alternate bus master can generate a bus request signal that is synchronous to the peripheral bus clock signal to thereby obtain a grant signal from a bus arbiter unit. As a result, the peripheral bus clock signal can be stopped for power management while still accommodating alternate bus masters that must assert a synchronous bus request signal to obtain mastership of the peripheral bus.

20 Claims, 6 Drawing Sheets

SYSTEM AND METHOD FOR RE-STARTING A PERIPHERAL BUS CLOCK SIGNAL AND REQUESTING MASTERSHIP OF A PERIPHERAL BUS

BACKGROUND OF THE INVENTION

1. Field of the Invention

This invention relates to power management within computer systems and, more particularly, to a system and method for restarting a peripheral bus clock signal and requesting mastership of a peripheral bus.

2. Description of the Relevant Art

An ongoing developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMU's). One specific technique involves the capability of stopping clock signals that drive inactive or idle circuit portions. A system employing such a technique typically includes a power management unit that detects or predicts inactive circuit portions and accordingly stops the clock signals that are associated with the inactive circuit portions. By turning off "unused" clock signals, overall power consumption of the system is decreased.

Although the capability of stopping "unused" clock signals has been generally successful in reducing power consumption, the technique has generally not been applied to clock signals that drive peripheral buses having alternate bus masters connected thereto. The reason for this limitation is best understood from the following example.

FIG. 1 is a block diagram that illustrates a computer system 10 including a microprocessor (CPU) 12, a system memory 14, a bridge/memory controller 16, and a bus interface and arbiter unit 18. A CPU local bus 20 couples the microprocessor 12 to bridge/memory controller 16 and bus interface and arbiter unit 18. A system memory bus 22 couples system memory 14 to bridge/memory controller 16. An alternate bus master 26 labeled "Master1" and a second alternate bus master 28 labeled "Master2" are coupled to the bus interface and arbiter unit 18 through a peripheral bus 30.

When alternate bus master 26 requires mastership of peripheral bus 30, a request signal labeled $\overline{REQ1}$ is asserted by the alternate bus master 26 and is detected by bus interface and arbiter unit 18. If mastership of the bus is granted in accordance with the internal arbitration logic, the bus interface and arbiter unit 18 asserts a grant signal labeled $\overline{GNT1}$ and, accordingly, alternate bus master 26 attains mastership of peripheral bus 30 and may execute the desired cycle.

In the system of FIG. 1, the request signal $\overline{REQx}$ (i.e., $\overline{REQ1}$ or $\overline{REQ2}$) must be asserted by the associated alternate bus master synchronous to the peripheral bus clock signal CLK. This requirement is specified by several prevalently utilized peripheral bus standards, such as the PCI local bus standard. As a result of the requirement, systems employing such peripheral bus standards are designed such that the peripheral bus clock signal CLK is always turned on, thereby allowing an alternate bus master to generate a synchronous request signal. In such systems, however, power is wasted when the peripheral bus is idle.

SUMMARY OF THE INVENTION

The problems outlined above are in large part solved by a system and method for re-starting a peripheral bus clock signal and requesting mastership of a peripheral bus according to the present invention. The system accommodates a power conservation technique in which a peripheral bus clock signal may be stopped, for example, by a power management unit. If an alternate bus master requires mastership of the peripheral bus when the peripheral bus clock signal is stopped, the alternate bus master asserts a clock request signal for re-starting the peripheral bus clock. The clock request signal is broadcasted on the peripheral bus and is accordingly received by a clock control circuit. The clock control circuit responsively causes the re-starting of the peripheral bus clock signal. Subsequently, the alternate bus master can generate a bus request signal that is synchronous to the peripheral bus clock signal to thereby obtain a grant signal from a bus arbiter unit. As a result of a system according to the present invention, the peripheral bus clock signal can be stopped for power management while still accommodating alternate bus masters that must assert a synchronous bus request signal to obtain mastership of the peripheral bus.

Broadly speaking, the present invention contemplates a computer system comprising a microprocessor, a local bus coupled to the microprocessor, a peripheral bus, and a bus interface and arbiter unit coupled to the local bus and to the peripheral bus. A clock generator circuit is provided for generating a peripheral bus clock signal that is capable of being selectively stopped and re-started. An alternate bus master is coupled to the peripheral bus that is capable of asserting a clock request signal when the peripheral bus clock signal is stopped. A clock control circuit is further coupled to the alternate bus master for re-starting the peripheral bus clock signal in response to the assertion of the clock request signal.

The present invention additionally contemplates a system for re-starting a peripheral bus clock signal and for requesting mastership of a peripheral bus comprising a clock generator for generating the peripheral bus clock signal and a power management unit coupled to the clock generator for stopping the peripheral bus clock signal upon the occurrence of a predetermined condition. A clock control circuit is coupled to receive an asynchronous clock request signal generated by an alternate bus master when the peripheral bus clock signal is stopped. The clock control circuit generates a command signal in response to the asynchronous clock request signal that causes the power management unit to re-start the peripheral bus clock signal. A bus arbiter unit is responsive to the bus request signal and generates a grant signal for indicating mastership of the peripheral bus.

The present invention still further contemplates a method for re-starting a peripheral bus clock signal and requesting mastership of a peripheral bus comprising the steps of stopping the peripheral bus clock signal upon the occurrence of a predetermined condition, generating an asynchronous clock request signal within an alternate bus master, and re-starting the peripheral bus clock signal in response to the asynchronous clock request signal. The method further comprises the step of generating a synchronous bus request signal within the alternate bus master after the peripheral bus clock signal has been re-started.

BRIEF DESCRIPTION OF THE DRAWINGS

Other objects and advantages of the invention will become apparent upon reading the following detailed description and upon reference to the accompanying drawings in which.

Figure 1:
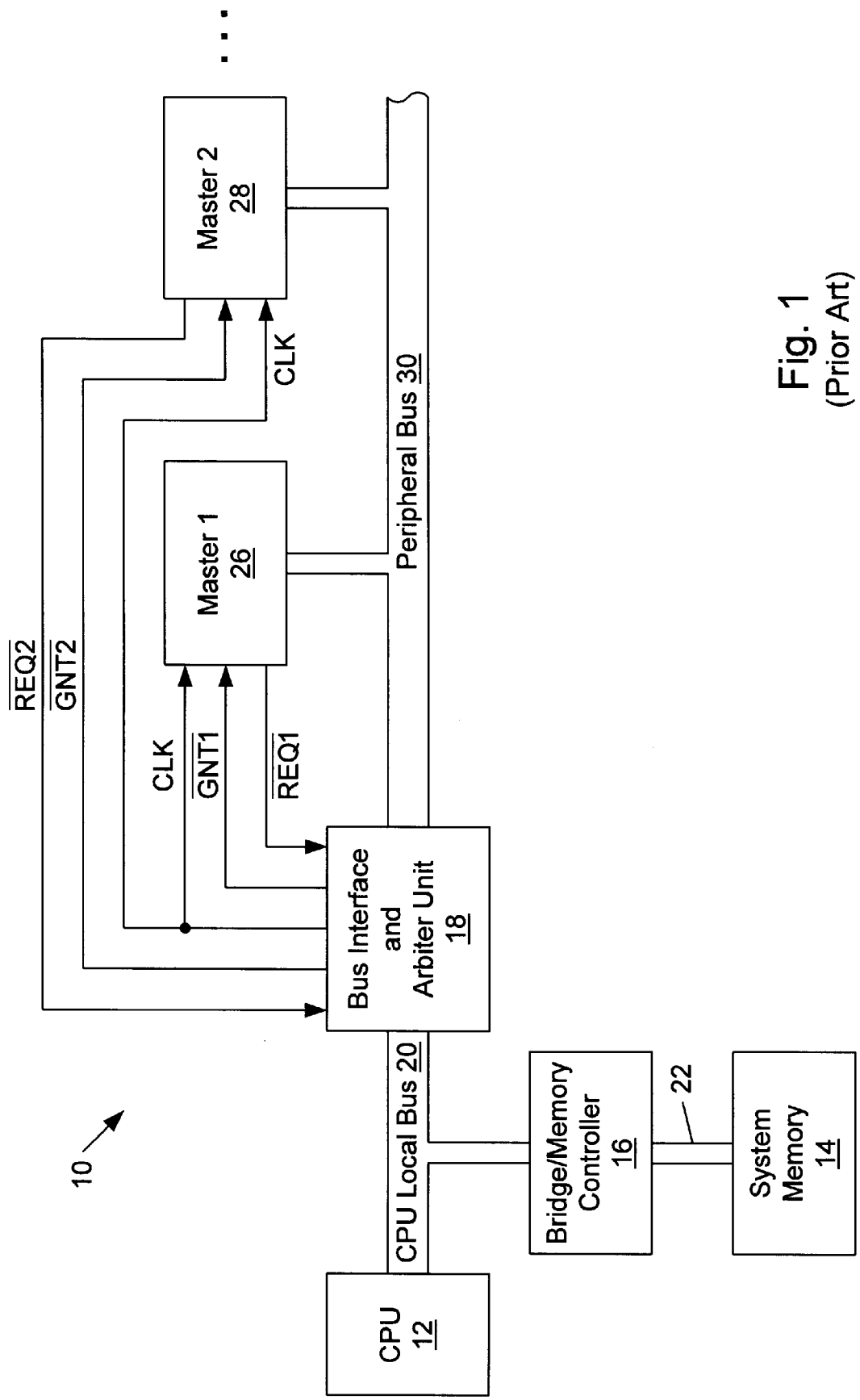
FIG. 1 is a block diagram that illustrates a computer system including a peripheral bus and a plurality of alternate bus masters coupled thereto.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
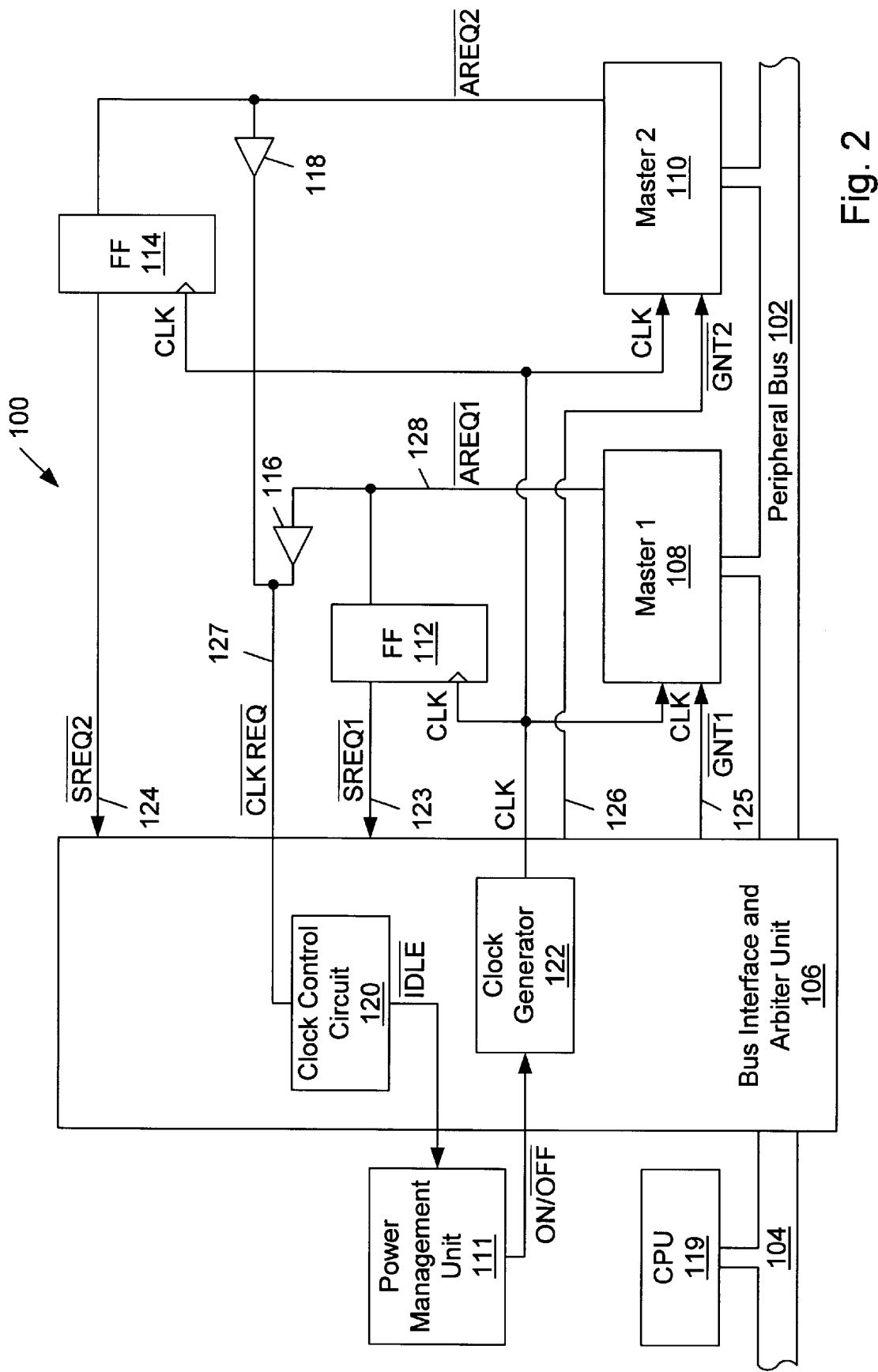
FIG. 2 is a block diagram that illustrates a portion of a computer system including a clock control circuit for re-starting a peripheral bus clock signal in accordance with the present invention.

Referring now to FIG. 2, a block diagram is shown of a portion of a computer system 100 in which a peripheral bus 102 is coupled to a CPU local bus 104 through a bus interface and arbiter unit 106. An alternate bus master 108 labeled "Master1" and a second alternate bus master 110 labeled "Master2" are coupled to peripheral bus 102, and a microprocessor (CPU) 119 is coupled to CPU local bus 104. A power management unit 111, flip-flops 112 and 114, and signal drivers 116 and 118 are further coupled to bus interface and arbiter unit 106.

The alternate bus masters 108 and 110 could be embodied by a variety of specific peripheral bus devices. For example, alternate bus master 108 could be embodied by a local area network (LAN) device that connects other computer systems to peripheral bus 102. Similarly, alternate bus master 110 could be embodied by an expansion bus interface that connects peripheral bus 102 to other peripheral buses.

Peripheral bus 102 has a predetermined bit width and may be connected to a variety of other peripheral devices such as CD-ROM devices. In one embodiment, peripheral bus 102 is implemented using the PCI (peripheral component interconnect) local bus standard configuration, although other peripheral bus standard configurations could be alternatively employed. The PCI standard bus configuration is described in the publication *PCI Local Bus Specification*, Revision 2, Apr. 30, 1993, PCI Special Interest Group. This document is incorporated herein by reference in its entirety.

Microprocessor 119 is a data processing unit that implements a predetermined instruction set. Exemplary processing units include the model 80386 and model 80486 microprocessors. It is noted that the CPU local bus 104 may couple microprocessor 119 to a variety of other components, such as a cache memory and a memory controller.

The bus interface and arbiter unit 106 includes conventional circuitry that controls well known interfacing functions such as orchestrating and transferring control, data, and address signals between microprocessor 119 and devices coupled to peripheral bus 102. The bus interface and arbiter unit 106 further arbitrates and prioritizes devices that contend for the mastership of peripheral bus 102. Similar to the example described previously in conjunction with FIG. 1, arbitration logic within the bus interface and arbiter unit 106 is configured to detect a synchronous request signal asserted by an alternate bus master and to generate an associated grant signal when mastership of the peripheral bus 102 can be attained. The bus interface and arbiter unit 106 receives synchronous request signals $\overline{SREQ1}$ and $\overline{SREQ2}$ at lines 123 and 124, respectively, and generates grant signals $\overline{GNT1}$ and $\overline{GNT2}$ at lines 125 and 126, respectively. It will be appreciated by those skilled in the art that these portions of the bus interface and arbiter unit 106 could be implemented using a variety of specific circuit configurations, and that exemplary circuit configurations are described in a host of publications of the known prior art.

The bus interface and arbiter unit 106 additionally includes a clock control circuit 120 and a clock generator 122. The clock generator 122 generates a peripheral bus clock signal labeled "CLK" for driving peripheral devices such as alternate bus master 108 and alternate bus master 110. As will be explained in greater detail below, the clock control circuit 120 controls the re-starting of clock generator 122 to accommodate alternate bus masters after power management unit 111 has stopped the peripheral bus clock signal CLK.

The operation of computer system 100 will be described next. For this discussion, it is assumed initially that power management unit 111 has caused clock generator 122 to turn off and thus that the peripheral bus clock signal CLK is stopped. Power management unit 111 may be configured to turn off clock generator 122 following, for example, the completion of a peripheral bus cycle executed by microprocessor 119 when no bus request signals are currently pending within bus interface and arbiter unit 106.

If one of the alternate bus masters 108 or 110 requires mastership of peripheral bus 102, a corresponding asynchronous bus request signal is asserted by that device. For example, if alternate bus master 108 requires mastership of peripheral bus 102, asynchronous request signal $\overline{AREQ1}$ is asserted low at line 128. As with the example of FIG. 1, the request signal received by bus interface and arbiter unit 106 at line 123 must be synchronous to the peripheral bus clock signal CLK. However, at this point, the clock generator 122 is turned off. Therefore, to provide a synchronous request signal, the asynchronous request signal $\overline{AREQ1}$ buffered through signal driver 116 which causes an asynchronous clock request signal $\overline{CLKREQ}$ at line 127 to be asserted low. When clock control circuit 120 detects the low assertion of the clock request signal $\overline{CLKREQ}$, a signal $\overline{IDLE}$ is deasserted high by clock control circuit 120 which causes the power management unit 111 to turn on clock generator 122 and thus re-start the peripheral bus clock signal CLK (i.e., by driving signal ON/OFF high).

Upon the rising edge of the first peripheral clock signal CLK, the logical low signal at the line 128 (i.e., signal $\overline{AREQ1}$) is latched into flip-flop 112 and is driven at the output of flip-flop 112. Accordingly, a synchronous request signal $\overline{SREQ1}$ dictated by the output state of flip-flop 112 goes low. It is noted that the low transition of signal $\overline{SREQ1}$ occurs synchronously with the clock signal CLK.

When the bus interface and arbiter unit 106 detects the low assertion of the synchronous request signal $\overline{SREQ1}$, the bus interface and arbiter unit 106 generates the grant signal $\overline{\text{GNT1}}$ according to its internal arbitration logic and consequently grants mastership of the peripheral bus 102 to the alternate bus master 108.

In the preferred embodiment, the alternate bus master 108 asserts the asynchronous request signal $\overline{\text{AREQ1}}$ for a total of two clock cycles when mastership of peripheral bus 102 is desired. When the clock control circuit 120 detects the resulting low signal at line 127, the clock control circuit 120 takes over the drive and maintains a logical low signal at line 127, even though the asynchronous request signal $\overline{\text{AREQ1}}$ has been deasserted by alternate bus master 108 following the two clock cycles. After the $\overline{\text{IDLE}}$ signal is deasserted high and clock generator 122 has been turned on by power management unit 111, the peripheral bus clock signal CLK cannot be stopped until the system microprocessor 119 regains mastership of peripheral bus 102, at which point the power management unit 111 may determine that the clock generator 122 can be stopped. For example, as stated previously, power management unit 111 may be configured to stop the peripheral bus clock signal CLK upon the completion of a peripheral bus cycle executed by microprocessor 119 if no bus request signals are currently pending within bus interface and arbiter unit 106. When the power management unit 111 determines that the peripheral bus clock signal CLK can be stopped according to such a predetermined condition, the clock control circuit 120 drives the clock request signal $\overline{\text{CLKREQ}}$ high for one clock cycle. Following this, the clock control circuit 120 releases the drive of the clock request signal $\overline{\text{CLKREQ}}$ and tri-states line 126. The power management unit 111 then turns off clock generator 122 by driving signal ON/OFF low, thereby causing the peripheral bus clock signal CLK to stop.

Figure 2A:
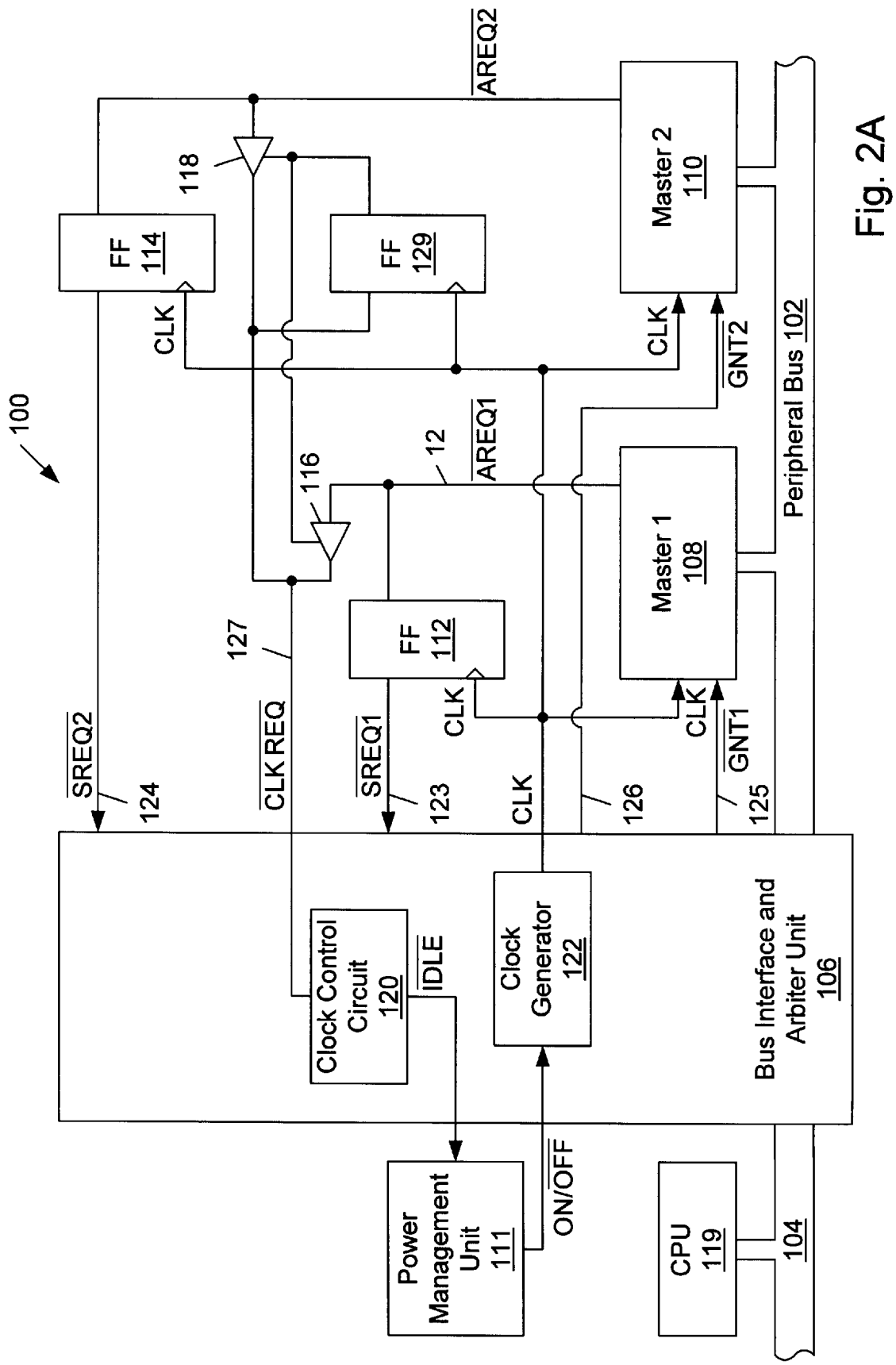
FIG. 2A is a block diagram that illustrates a portion of a computer system in accordance with a further embodiment of the present invention.

It is noted that in the preferred embodiment, signal drivers 116 and 118 are enabled only if line 127 was sampled high during the rising edge of the last peripheral bus clock signal CLK. This prevents possible signal contention at line 127 if an asynchronous request signal $\overline{\text{AREQx}}$ (i.e., $\overline{\text{AREQ1}}$ or $\overline{\text{AREQ2}}$) is asserted low at the same time the clock control circuit 120 drives line 127 high. An implementation of this feature is illustrated in FIG. 2A in which a flip-flop 129 is used to sample line 127 during each cycle of the peripheral clock signal CLK, and to enable signal drivers 116 and 118 only if line 127 was sampled high.

Referring back to FIG. 2, if the asynchronous request signals $\overline{\text{AREQ1}}$ and $\overline{\text{AREQ2}}$ are asserted simultaneously or concurrently, indicating that both alternate bus masters 108 and 110 desire mastership of peripheral bus 102, the clock request signal $\overline{\text{CLKREQ}}$ will again be driven low, thereby causing the peripheral bus clock signal CLK to restart. The synchronous request signals $\overline{\text{SREQ1}}$ and $\overline{\text{SREQ2}}$ are accordingly provided at the outputs of flip-flops 112 and 114, respectively, and are received at bus interface and arbiter unit 106. One of the grant signals $\overline{\text{GNT1}}$ or $\overline{\text{GNT2}}$ will thereafter be asserted in accordance with the predetermined priority established by the internal arbitration logic, and the other grant signal will be delayed until the "higher-priority" alternate bus master has completed its corresponding bus cycle. Thereafter, the bus interface and arbiter 106 unit asserts the other grant signal to allow the "lower priority" alternate bus master to execute its corresponding bus cycle.

Figure 3:
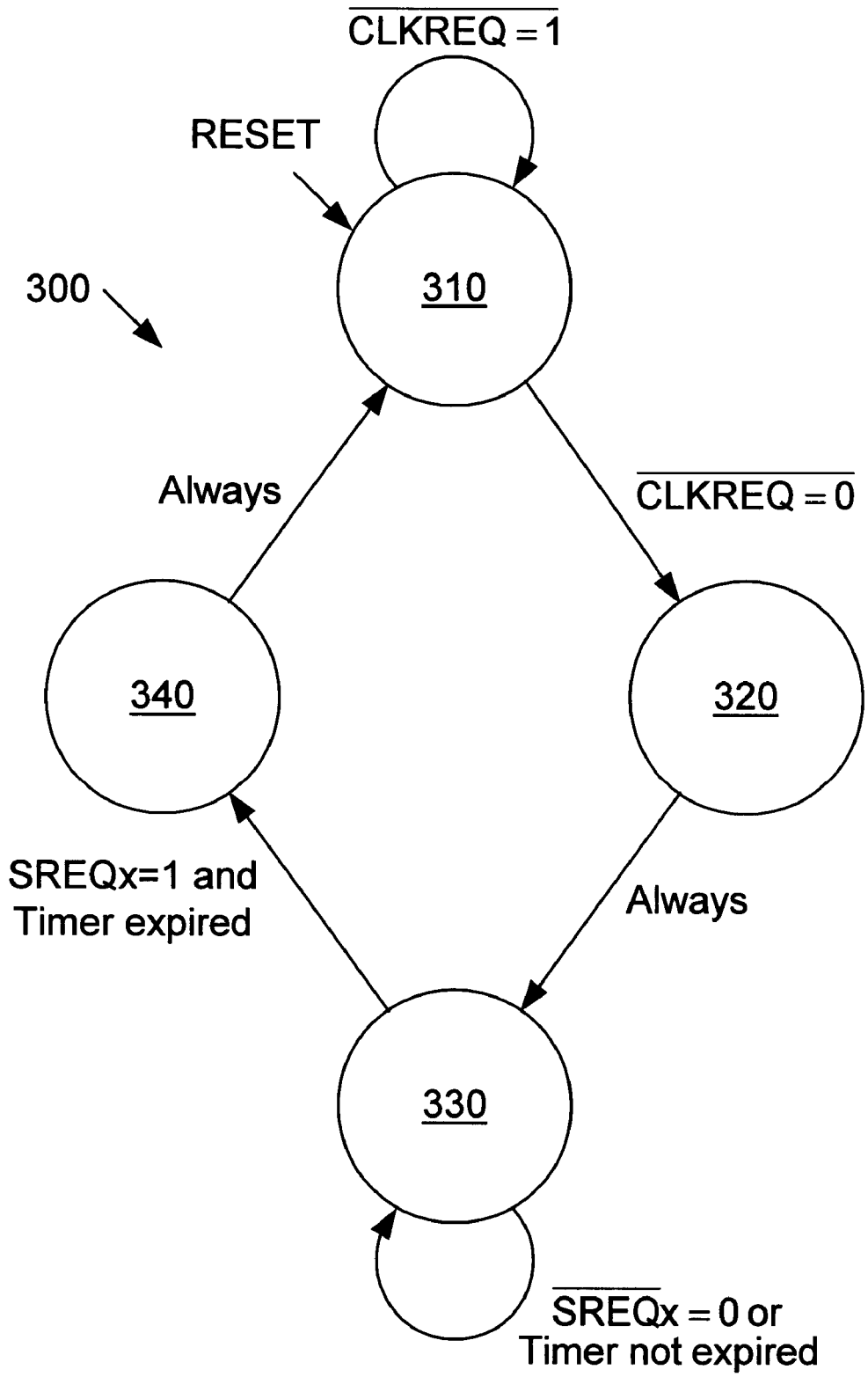
FIG. 3 is a diagram of an algorithmic state machine that embodies the clock control circuit of FIG. 2.

The internal logic of the clock control circuit 120 is next considered. FIG. 3 is a diagram of an algorithmic state machine 300 that embodies the clock control circuit 120. State machine 300 includes four states 310, 320, 330 and 340. When the peripheral bus clock signal CLK is stopped, state machine 300 is in an idle state 310. State machine 300 remains in state 310 for as long as the clock request signal $\overline{\text{CLKREQ}}$ is high.

When the clock request signal $\overline{\text{CLKREQ}}$ goes low, state machine 300 enters a state 320. This transition occurs when one of the asynchronous request signals $\overline{\text{AREQx}}$ has been asserted by one of the alternate bus masters. During state 320, the clock control circuit 120 drives line 127 low and deasserts signal $\overline{\text{IDLE}}$ high. Power management unit 111 detects the deassertion of signal $\overline{\text{IDLE}}$ and consequently turns on clock generator 122 to re-start the peripheral bus clock signal CLK.

State machine 300 next enters state 330 during which the $\overline{\text{IDLE}}$ signal continues to be deasserted high. State machine 300 remains in state 330 for the entire time that a synchronous request signal $\overline{\text{SREQx}}$ is low. If all synchronous request signals are high, state machine 300 remains in state 330 for a predetermined time in accordance with a delay time established by an internal timer. This delay time is provided to ensure that ample time is provided after re-starting the clock signal CLK for the corresponding synchronous request signal $\overline{\text{SREQx}}$ to be driven low (i.e., by flip-flop 112 or 114). In one embodiment, the internal timer of state 330 is defined to ensure that at least four clock cycles have transpired before state machine 300 can exit from state 330.

When the synchronous request signals $\overline{\text{SREQx}}$ are high and the timer has expired, state machine 300 enters state 340. During state 340, the clock request signal $\overline{\text{CLKREQ}}$ is driven high by the clock control circuit 120 for one clock cycle. The $\overline{\text{IDLE}}$ signal is further asserted low.

The state machine 300 next reverts back to idle state 310 and clock control circuit 120 tri-states the clock request line 127. The power management unit 111 may subsequently turn off clock generator 122 after the system microprocessor 119 has regained mastership of peripheral bus 102, or according to any other desired power management scheme. Thereafter, the peripheral bus clock signal CLK may again be re-started by another alternate bus master in a similar manner by asserting the clock request signal low.

Referring back to FIG. 2, it is noted that flip-flops 112 and 114 as well as signal drivers 116 and 118 may be incorporated as integral parts of the alternate bus masters 108 and 110. It is further noted that although signal lines 123–127 are shown separately from peripheral bus 102 for simplicity, signal lines 123–127 may be predefined control lines of the peripheral bus 102.

Figure 4:
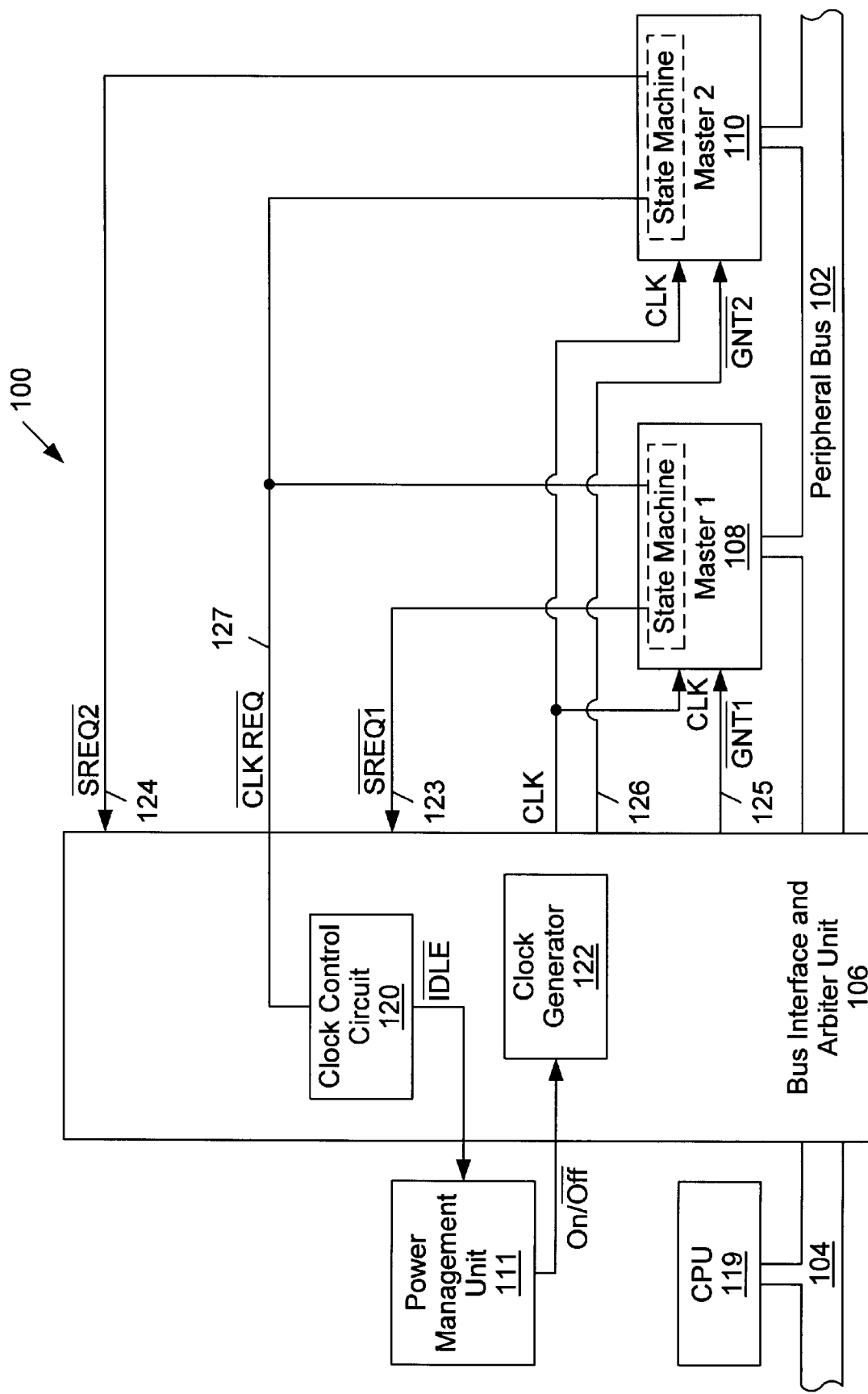
FIG. 4 is a block diagram of a portion of a computer system according to yet another embodiment of the present invention.
Figure 5:
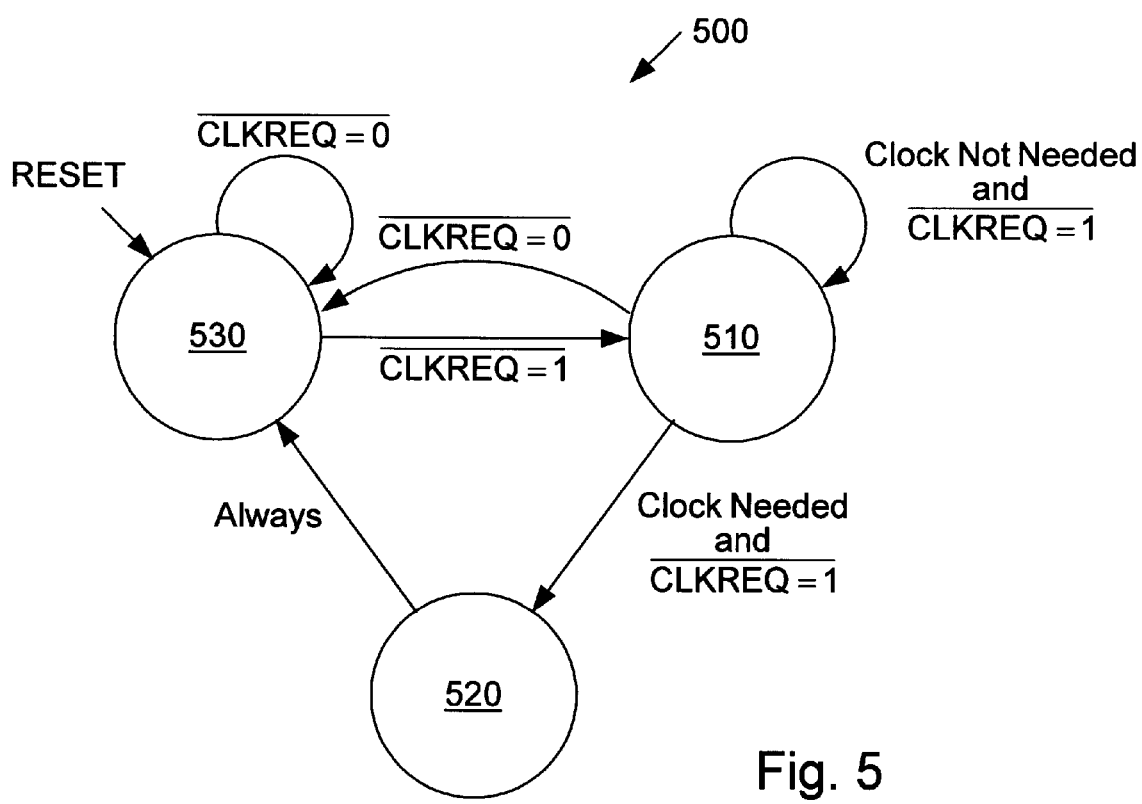
FIG. 5 is a diagram of an algorithmic state machine embodied within an alternate bus master.

In another embodiment as illustrated in FIG. 4, a state machine is incorporated within each alternate bus master to generate the clock request signal $\overline{\text{CLKREQ}}$ and the synchronous request signal $\overline{\text{SREQx}}$. FIG. 5 is a diagram of an algorithmic state machine 500 incorporated within each alternate bus master of such an embodiment. State machine 500 includes states 510, 520 and 530.

Referring to FIG. 5 with reference to FIGS. 3 and 4, when the peripheral bus clock signal CLK is stopped and the clock request signal $\overline{\text{CLKREQ}}$ is high, state machine 500 remains in state 510. During this time, the alternate bus master 108 tri-states the clock request line 127.

If the alternate bus master 108 requires the peripheral bus clock signal CLK to execute a particular cycle on peripheral bus 102, a clock request signal $\overline{\text{CLKREQ}}$ is asserted low for two clock cycles during state 520 and, subsequently, state machine 500 enters state 530. As described previously, when the clock request signal $\overline{\text{CLKREQ}}$ is asserted low, state machine 300 of the clock control circuit 120 causes the peripheral bus clock signal CLK to re-start.

State machine 500 tri-states the clock request line 127 during state 530 and remains in state 530 for as long as the clock request line is driven low (by the clock control circuit 120). When the clock request line 127 goes high, state machine 500 reverts back to state 510. It is noted that upon reset, state machine 500 enters state 530 since the peripheral bus clock signal CLK is initially turned on at reset.

The algorithmic state machines 300 and 500 may be reduced to sequential logic circuits by employing a variety of well known circuit reduction techniques. For example, sequential logic circuitry that implements state machines 300 and 500 may be attained in accordance with the state reduction techniques taught within the publication *Digital Design* by M. Morris Mano, Prentice-Hall, Inc., pp 220–236; and within the publication *Digital Computer Fundamentals*—6th Edition by Thomas Bartee, McGraw-Hill Book Company, pp 170–175. These publications are incorporated herein by reference.

Computer-aided design tools may alteratively be employed to reduce the state machines 300 and 500 to sequential logic circuits. Exemplary computer-aided design tools include the VHSIC hardware description language and the VERILOG description language.

The power management unit 111 of FIGS. 2 and 4 may be configured to implement a variety of additional power management functions in addition to that described above. For example, power management unit 111 may be designed to implement functions similar to those described in U.S. Pat. No. 5,167,024 issued Nov. 24, 1992 to Smith et al. This patent is incorporated herein by reference in its entirety.

Furthermore, although the clock generator of 122 of FIGS. 2 and 4 is shown within a bus interface and arbiter unit 106, the clock generator 122 could be incorporated within a variety of alternative circuit blocks of computer system 100.

As a result of the systems of FIGS. 2 and 4, a peripheral bus clock signal may be stopped for power management while still accommodating alternate bus masters that must assert a synchronous bus signal to obtain mastership of the peripheral bus. Power consumption of the computer systems may thereby be reduced while maintaining broad compatibility.

Numerous variations and modifications will become apparent to those skilled in the art once the above disclosure is fully appreciated. It is intended that the following claims be interpreted to embrace all such variations and modifications.

What is claimed is:

1. A computer system comprising:
   a microprocessor;
   a local bus coupled to said microprocessor;
   a peripheral bus;
   a bus interface and arbiter unit coupled to said local bus and to said peripheral bus for orchestrating the transfer of data and address signals between said local bus and said peripheral bus and for arbitrating mastership of said peripheral bus;
   a clock generator circuit for providing a peripheral bus clock signal on said peripheral bus, wherein said clock generator circuit is configured to selectively stop and re-start said peripheral bus clock signal;
   an alternate bus master coupled to said peripheral bus wherein said alternate bus master is configured to assert a clock request signal when said peripheral bus clock signal is stopped and is configured to assert a bus request signal synchronously with said peripheral bus clock signal when said peripheral bus clock signal is re-started, and wherein said bus request signal is provided to said bus interface and arbiter unit for requesting mastership of said peripheral bus; and
   a clock control circuit coupled to said alternate bus master and configured to re-start said peripheral bus clock signal in response to the assertion of said clock request signal.

2. The computer system as recited in claim 1 further comprising a latching circuit coupled to receive said clock request signal, wherein said latching circuit provides said bus request signal to said bus interface and arbiter unit in response to the peripheral bus clock signal.

3. The computer system as recited in claim 1 wherein said alternate bus master includes a state machine that asserts said clock request signal when said peripheral bus clock signal is stopped and that asserts said bus request after said peripheral bus clock signal is re-started.

4. The computer system as recited in claim 1 wherein said peripheral bus is a multiplexed address/data bus.

5. The computer system as recited in claim 3 further comprising a power management unit coupled to said clock control circuit and to said clock generator circuit, wherein said power management unit is configured to provide a control signal to said clock generator for selectively stopping and re-starting said peripheral bus clock signal, and wherein said clock control circuit is configured to provide a command signal to said power management unit in response to said clock request signal.

6. The computer system as recited in claim 5 wherein said power management unit is configured to stop said peripheral bus clock signal upon the occurrence of a predetermined condition after said microprocessor has attained mastership of said peripheral bus.

7. The computer system as recited in claim 3 wherein said bus interface and arbiter unit is configured to assert a bus grant signal in response to said bus request signal.

8. The computer system as recited in claim 3 wherein said peripheral bus includes a control line for coupling said clock request signal from said alternate bus master to said clock control circuit.

9. A system for re-starting a peripheral bus clock signal and requesting mastership of a peripheral bus comprising:
   a clock generator for generating said peripheral clock signal;
   a power management unit coupled to said clock generator for stopping said peripheral bus clock signal upon the occurrence of a predetermined condition;
   a clock control circuit coupled to receive an asynchronous clock request signal generated by an alternate bus master when said peripheral bus clock signal is stopped, wherein said clock control circuit is configured to generate a command signal in response to said asynchronous clock request signal that causes said power management unit to re-start said peripheral bus clock signal; and
   a bus arbiter unit responsive to a bus request signal generated by said alternate bus master, wherein said bus request signal is synchronous to said peripheral bus clock signal, and wherein said bus arbiter unit is configured to generate a grant signal in response to said bus request signal for indicating mastership of said peripheral bus to said alternate bus master.

10. The system for re-starting a peripheral bus clock signal and requesting mastership of a peripheral bus as recited in claim 9 wherein said alternate bus master includes a state machine configured to assert said asynchronous clock request signal when said peripheral bus clock signal is stopped and to assert said bus request signal after said peripheral bus clock signal is re-started.

11. The system for re-starting a peripheral bus clock signal and requesting mastership of a peripheral bus as recited in claim 9 wherein said clock control circuit includes a state machine configured to assert said command signal in response to said asynchronous clock signal.

12. The system for re-starting a peripheral bus clock signal and requesting mastership of a peripheral bus as recited in claim 9 wherein said peripheral bus is a multiplexed address/data bus.

13. The system for re-starting a peripheral bus clock signal and requesting mastership of a peripheral bus as recited in claim 9 further comprising a control line incorporated on said peripheral bus for coupling said asynchronous clock request signal from said alternate bus master to said clock control circuit.

14. A method for re-starting a peripheral bus clock signal and requesting mastership of a peripheral bus comprising the steps of:

stopping said peripheral bus clock signal upon the occurrence of a predetermined condition;

generating an asynchronous clock request signal within an alternate bus master;

re-starting said peripheral bus clock signal in response to said asynchronous clock request signal; and generating a synchronous bus request signal within said alternate bus master to request mastership of said peripheral bus after said peripheral bus clock signal has been re-started, wherein said synchronous bus request signal is synchronous to said peripheral bus clock signal.

15. The method for re-starting a peripheral bus clock signal and requesting mastership of a peripheral bus as recited in claim 14 comprising the further step of generating a bus grant signal in response to said synchronous bus request signal.

16. The method for re-starting a peripheral bus clock signal and requesting mastership of a peripheral bus as recited in claim 14 wherein said step of re-starting said peripheral bus clock signal includes the step of coupling the asynchronous clock request signal from said alternate bus master to a clock control circuit through a control line incorporated on said peripheral bus.

17. The method for re-starting a peripheral bus clock signal and requesting mastership of a peripheral bus as recited in claim 15 wherein said step of generating a bus grant signal is performed by a bus arbiter unit.

18. A computer system comprising:

a peripheral bus;

an arbiter unit for arbitrating mastership of said peripheral bus;

a clock generator circuit for providing a peripheral bus clock signal on said peripheral bus, wherein said clock generator circuit is configured to selectively stop and re-start said peripheral bus clock signal;

an alternate bus master coupled to said peripheral bus and to said bus arbiter, wherein said alternate bus master is configured to assert a clock request signal when said peripheral bus clock signal is stopped and is configured to assert a bus request signal synchronously with said peripheral bus clock signal when said peripheral bus clock signal is re-started, wherein said bus request signal is provided to said arbiter unit for requesting mastership of said peripheral bus; and a clock control circuit coupled to said alternate bus master and configured to re-start said peripheral bus clock signal in response to the assertion of said clock request signal.

19. The computer system as recited in claim 18 further comprising a power management unit coupled to said clock control circuit and to said clock generator circuit, wherein said power management unit is configured to provide a control signal to said clock generator for selectively stopping and re-starting said peripheral bus clock signal, and wherein said clock control circuit is configured to provide a command signal to said power management unit to cause a re-starting of said peripheral bus clock signal in response to said clock request signal.

20. The computer system as recited in claim 19 wherein said arbiter unit is configured to assert a bus grant signal in response to said bus request signal.

* * * * *